June 2, 1931.   A. C. ROWLEY   1,808,684
THERMOSENSITIVE RELEASE UNIT
Filed Nov. 3, 1928
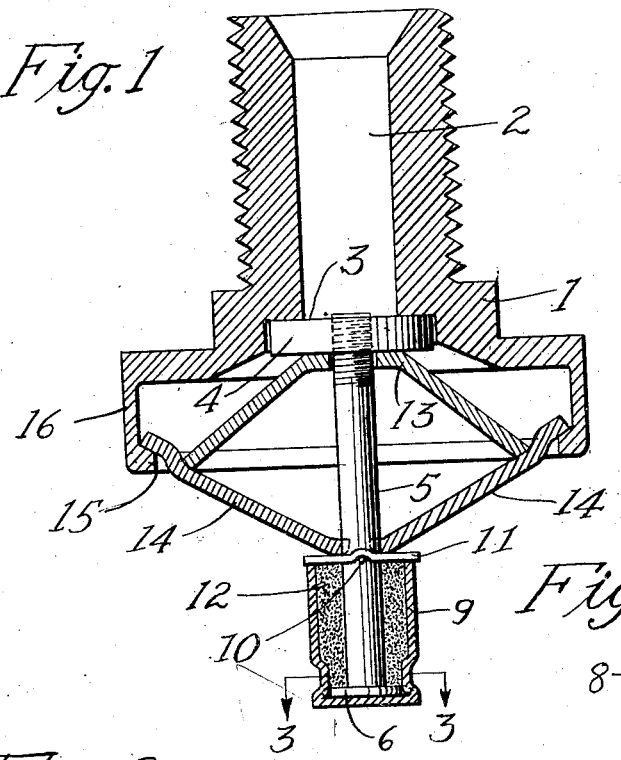
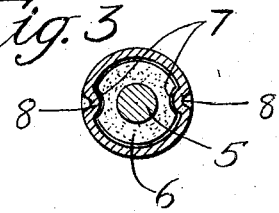
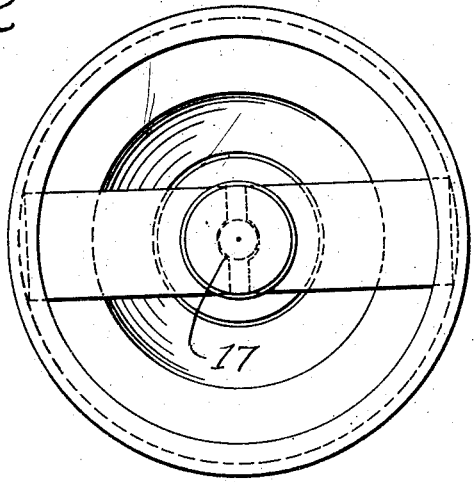
Inventor:—
Arthur C. Rowley
by his Attorneys
Howson & Howson Patented June 2, 1931

1,808,684

UNITED STATES PATENT OFFICE

ARTHUR C. ROWLEY, OF PHILADELPHIA, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA

THERMOSENSITIVE RELEASE UNIT

Application filed November 3, 1928. Serial No. 317,105.

The principal object of this invention is to provide a novel form of thermosensitive release unit adapted to support a load or resist a pressure and to release said load or pressure under predetermined temperature conditions.

In the attached drawings:

Figure 1 is a transverse section through a unit made in accordance with my invention;

Fig. 2 is an inverted plan view of the unit as shown in Fig. 1, and

Fig. 3 is a section on the line 3—3, Fig. 1.

With reference to the drawings, 1 is a relatively fixed member which in the present instance takes the form of a cylindrical body having a through passage 2 terminating at one end in a surface 3 which constitutes in the present instance a seat for an element 4. Obviously, the element 4, which takes the form in the present instance of a disk, and the immediately associated parts of the member 1 may be so formed that the said element constitutes a sealing closure for the passage 2.

5 is a stem, one end of which is threaded into the element 4, and this stem has at the opposite end a head or transverse enlargement 6, the purpose of which will be set forth hereinafter. The head 6, as shown in Fig. 3, is substantially circular in form, but has recesses or indentations 7 at opposite sides into which extend pressed-in portions 8 of a receptacle 9, which otherwise loosely fits over the head and the immediately adjacent portion of the stem 5. By reason of the interlocking recesses and indentations 7 and 8, the stem 5 and the receptacles 9 are relatively fixed as regards angular movement around the axis of the stem 5. The receptacle, however, is free, except as hereinafter set forth, to slide longitudinally of the stem.

11 is a perforated washer slidable on the stem 5, which as illustrated in Fig. 1 is adapted in assembly to abut the inner edge of the receptacle 9; and confined between this washer 11 and the head 6 and encased at the side by the receptacle 9 is a body of fusible compound 12, preferably of the character of alphamononitronaphthalene. The washer 11 preferably is corrugated as at 10 in that part bearing on the edges of the receptacle 9.

13 is a strut member which in assembly bears against the outer face of the element 4 and which comprises diverging inclined arms, the outer ends of which bear respectively upon levers 14, 14 as shown, the inner ends of these levers engaging in back of an annular boss 15 at the outer end of an annular flange 16 on the relatively fixed member 1, while the opposite ends of the levers engage the exposed face of the washer 11 and are recessed, as indicated at 17 in Fig. 2, to prevent displacement under normal conditions. With the parts in the relative position shown in Fig. 1, rotation of the stem 5 such as to cause the threads of the stem to enter the element 4 results in a tensioning of the strut 13 and the levers 14 which react with the relatively fixed member 1, the element 4 and the washer 11 in such manner as to hold the element 4 firmly to its seat 3 on the member 1.

When so assembled, the element 4 is held to its seat with considerable force, and is releasable by the fusion of the compound 12, this fusion permitting the washer 11 to move outwardly on the stem and thereby releasing the associated ends of the levers 14, with the result that the element 4 and associated parts are released and permitted to drop from the body 1.

It will be noted that the receptacle 9 is held in the assembled position only by the adhesion with the fusible compound or by friction therewith, so that when the compound fuses, the receptacle offers substantially no resistance to the outward movement of the washer 11 on the stem.

The illustrated embodiment of my invention is subject to considerable modification without departure from the invention.

I claim:

1. In a thermosensitive release unit, a relatively fixed member, a second member comprising elements spaced apart and relatively adjustable to vary the distance therebetween one of said elements comprising a fusible compound, and a system of struts and levers confined between said elements and reacting with said relatively fixed member to support said second member in the latter, said system being releasable by fusion of said fusible compound to permit displacement of said second member from the relatively fixed member.

2. In a thermosensitive release unit, a relatively fixed member, an element adapted to seat against said member, a stem threaded in said element, a fusible composition carried by said stem, a strut member slidable on the stem and adapted to seat against said seated element, said strut member comprising diverging arms, and a pair of levers constituting a bearing for the outer ends of said strut arms, the outer ends of said levers being fulcrumed on said relatively fixed member, and the inner ends being confined by said fusible compound whereby through said strut and levers the seated member is retained in position and is released upon the fusion of said fusible compound.

3. In a thermosensitive release unit, a base member having a port, a second member separate from the base member and including a port-closing element and a thermosensitive release element, and a system of levers and struts confined between said elements and reacting with the base member to retain the closure element in port-closing position against the base member.

4. In a thermosensitive release unit, a base member having a port, a second member including a port-closing element and a thermosensitive release element, a system of levers and struts confined between said elements and reacting with the base member to retain the closure element in port closing position against the base member, and means for relatively adjusting said elements to tension said levers and struts.

5. In a thermosensitive release unit, a base member having a port, an element seated upon the base member and closing the port, a stem extending from said element, an abutment on the stem, an element slidable on the stem, a fusible substance confined between and retaining the abutment and slidable element in spaced relation, and a system of struts and levers confined between the slidable element and the closure element and reacting with the base to retain the closure element in port-closing position.

6. In a thermosensitive release unit, a base member having a port, an element seated upon the base member and closing the port, a stem extending from said element, an abutment on the stem, a fusible plug seated on said abutment, and a system of struts and levers confined between said plug and the closure element and reacting with the base to retain the closure element in port-closing position.

ARTHUR C. ROWLEY.